United States Patent
Gupta et al.

(10) Patent No.: US 11,334,359 B2
(45) Date of Patent: May 17, 2022

(54) SYSTEMS AND METHODS FOR MANAGEMENT OF DYNAMIC DEVICES

(71) Applicant: Dell Products, L.P., Round Rock, TX (US)

(72) Inventors: Chitrak Gupta, Bangalore (IN);
Anurag Sharma, Cedar Park, TX (US);
Chandrasekhar Puthillathe, Bangalore (IN); Rajib Saha, Bangalore (IN);
Raghavendra Venkataramudu, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 97 days.

(21) Appl. No.: 17/038,563

(22) Filed: Sep. 30, 2020

(65) Prior Publication Data

US 2022/0100524 A1    Mar. 31, 2022

(51) Int. Cl.
| | | |
|---|---|---|
| *G06F 9/38* | (2018.01) | |
| *H04L 41/04* | (2022.01) | |
| *G06F 21/76* | (2013.01) | |

(52) U.S. Cl.
CPC ............ *G06F 9/3836* (2013.01); *G06F 21/76* (2013.01); *H04L 41/04* (2013.01)

(58) Field of Classification Search
CPC ......... G06F 9/3836; G06F 21/76; H04L 41/04
See application file for complete search history.

(56) References Cited

U.S. PATENT DOCUMENTS

| | | | | |
|---|---|---|---|---|
| 8,451,773 B2* | 5/2013 | Jiao | ....................... | H04W 48/20 370/328 |
| 2007/0086450 A1* | 4/2007 | Baumer | .................. | H04L 41/12 370/389 |
| 2014/0280665 A1* | 9/2014 | DeCusatis | ............. | H04L 49/252 709/212 |
| 2015/0286602 A1* | 10/2015 | Buckland | ............ | G06F 13/4221 710/301 |
| 2018/0054327 A1* | 2/2018 | Ameling | ................. | H04L 67/12 |

\* cited by examiner

*Primary Examiner* — Farley Abad
(74) *Attorney, Agent, or Firm* — Fogarty LLP

(57) ABSTRACT

Methods and systems are provided for managing dynamic devices of an IHS (Information Handling System) that include re-programmable logic circuitry. The dynamic devices of the IHS are identified and the type of a dynamic device is determined based on operations implemented by the re-programmable logic circuitry of that dynamic device. The dynamic device is enrolled for management by a remote access controller of the IHS based on its determined type. Messages are registered for management of the dynamic device, where the messages are selected based on its determined type. Remote management of the dynamic device is initiated using the registered messages. Any programming that changes the type of the dynamic device of the dynamic device is detected. If a change is detected, the dynamic device is enrolled for remote management using updated messages based on its updated type.

20 Claims, 4 Drawing Sheets

SYSTEMS AND METHODS FOR MANAGEMENT OF DYNAMIC DEVICES

FIELD

The present disclosure generally relates to Information Handling Systems (IHSs), and, more particularly, to remote monitoring and management of components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, a common technique for customizing the operations of an IHS has been through modifications to the software programs that are executed by the IHS. For instance, various applications that run in the operating system of an IHS may be modified in order to customize the operation of the IHS. Another technique for customizing the operations of an IHS has been through upgrading hardware components of the IHS. This requires manual administration and tends to be costly. More recently, FPGA (Field Programmable Gate Array) cards are used to provide customized IHS functionality at hardware speeds, while doing so at an affordable price when compared to hardware that is manufactured with customized integrated circuits. An FPGA card is typically customized by providing it instructions that are used to reprogram the internal operations of a logic unit of the FPGA. Since an FPGA card may be reprogrammed in this manner throughout its lifecycle, the operational characteristics of the FPGA card may also change. This evolving nature of the operational characteristics of dynamic devices, such as FPGA cards, poses a challenge for tools providing remote management of IHSs that include such dynamic devices.

SUMMARY

In various embodiments, IHSs (Information Handling Systems) may include: a plurality of dynamic devices, wherein each dynamic device comprises re-programmable logic circuitry; one or more processors; one or more memory devices coupled to the processors, the memory devices storing computer-readable instructions that, upon execution by the processors, cause operating system applications of the IHS to: identify the plurality of dynamic devices; determine a type of a first of the dynamic devices based on an operation implemented by the re-programmable logic circuitry of the first dynamic device; and enroll the first dynamic device for management by a remote access controller based on the determined type of the first dynamic device; and the remote access controller comprising one or more logic units and further comprising one or more memory devices storing computer-readable instructions that, upon execution by the logic units, cause the remote access controller to: register, in response to the enrollment, a first plurality of messages for the first dynamic device, wherein the messages are selected based on the determined type of the first dynamic device; and initiate remote management of the first dynamic device by generating the registered messages; and wherein the execution of instructions by the processors further cause the operating system applications to detect programming of the re-programmable logic circuitry of the first dynamic device and to determine when the detected programming changes the type of the first dynamic device from the identified type.

In additional IHS embodiments, the first dynamic device comprises an FPGA (Field Programmable Gate Array) card. In additional IHS embodiments, the first dynamic device comprises an embedded FPGA logic unit. In additional IHS embodiments, embedded FPGA logic unit is programmed to implement cryptographic protocols utilized by a network controller card and wherein the type of the FPGA logic unit is determined based on the FPGA logic unit implementing cryptographic operations. In additional IHS embodiments, the remote access controller manages the network controller card as a networking component and manages the embedded FPGA logic unit of the network controller card as a cryptographic component. In additional IHS embodiments, the execution of instructions by the processors further causes the operating system applications to enroll the first dynamic device for management by a remote access controller based on an updated type of the first dynamic device when the detected reprogramming of the changes the type of first dynamic device. In additional IHS embodiments, the operation used to determine the type of the first dynamic device comprises an acceleration function implemented using the re-programmable logic circuitry of the first dynamic device. In additional IHS embodiments, the first dynamic device comprises a programmable digital signal processor. In additional IHS embodiments, the first dynamic device comprises a programmable graphics processing unit.

In various additional embodiments, methods are provided that may include: identifying a plurality of dynamic devices of an IHS (Information Handling System), wherein each of the dynamic devices comprises re-programmable logic circuitry, wherein the dynamic devices are identified by an operating system application supporting remote management of the IHS; determining, by the operating system application, a type of a first of the dynamic devices based on an operation implemented by the re-programmable logic circuitry of the first dynamic device; enrolling, by the operating system application, the first dynamic device for management by a remote access controller of the IHS based on the determined type of the first dynamic device; registering, by the remote access controller, a first plurality of messages for the first dynamic device, wherein the messages are selected based on the determined type of the first dynamic device; initiating, by the remote access controller, remote management of the first dynamic device by generating the registered messages; detecting, by the operating system application, programming of the re-programmable logic circuitry of the first dynamic device; and determining, by the operating system application, when the detected programming changes the type of the first dynamic device from the identified type.

In additional method embodiments, the first dynamic device comprises an FPGA (Field Programmable Gate Array) card. In additional method embodiments, the first dynamic device comprises an embedded FPGA logic unit of a network controller card. In additional method embodiments, the embedded FPGA logic unit is programmed to implement cryptographic protocols utilized by the network controller card and wherein the type of the FPGA logic unit is determined based on the FPGA logic unit implementing cryptographic operations. In additional method embodiments, the remote access controller manages the network controller card as a networking component and manages the embedded FPGA logic unit of the network controller card as a cryptographic component. In additional method embodiments, enrolling the first dynamic device for management by a remote access controller based on an updated type of the first dynamic device when the detected reprogramming of the changes the type of first dynamic device. In additional method embodiments, the operation used to determine the type of the first dynamic device comprises an acceleration function implemented using the re-programmable logic circuitry of the first dynamic device.

In various additional embodiments, one or more computer-readable storage devices are provided having instructions stored thereon for providing remote management of an IHS (Information Handling System), wherein execution of the instructions by one or more processors of the IHS causes the one or more processors to: identify a plurality of dynamic devices of an IHS (Information Handling System), wherein each of the dynamic devices comprises re-programmable logic circuitry, wherein the dynamic devices are identified by an operating system application supporting remote management of the IHS; determine a type of a first of the dynamic devices based on an operation implemented by the re-programmable logic circuitry of the first dynamic device; enroll the first dynamic device for management by a remote access controller of the IHS based on the determined type of the first dynamic device; register a first plurality of messages for the first dynamic device, wherein the messages are selected based on the determined type of the first dynamic device; initiate remote management of the first dynamic device by generating the registered messages; detect programming of the re-programmable logic circuitry of the first dynamic device; and determine when the detected programming changes the type of the first dynamic device from the identified type.

In additional storage device embodiments, the first dynamic device comprises an FPGA (Field Programmable Gate Array) card. In additional storage device embodiments, the first dynamic device comprises an embedded FPGA logic unit of a network controller card. In additional storage device embodiments, the operation used to determine the type of the first dynamic device comprises an acceleration function implemented using the re-programmable logic circuitry of the first dynamic device.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
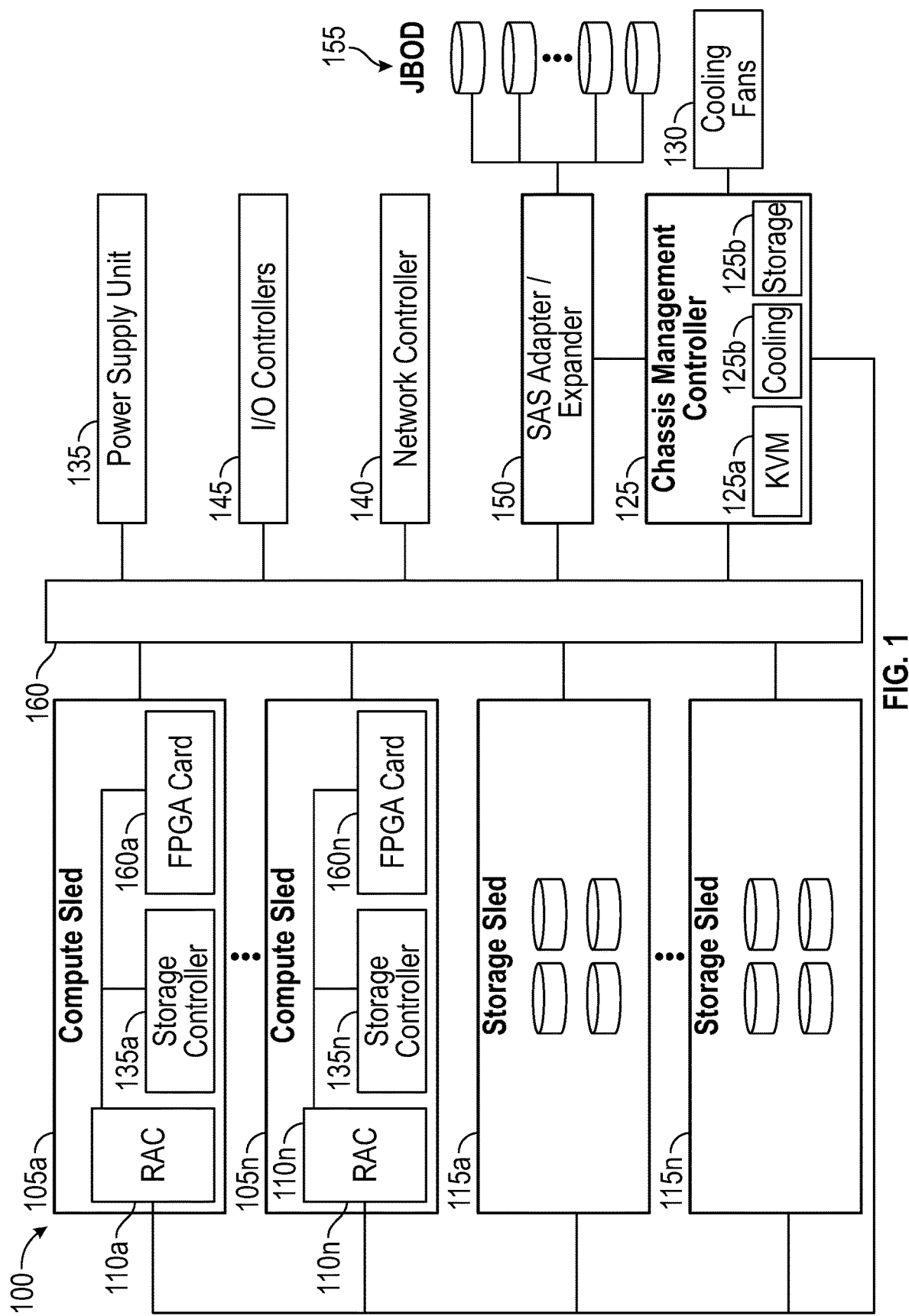
FIG. 1 is a diagram illustrating certain components of a chassis, according to some embodiments, for supporting remote monitoring and management of dynamic devices.

FIG. 1 is a block diagram illustrating certain components of a chassis 100 comprising one or more compute sleds 105a-n and one or more storage sleds 115a-n that may be configured to implement the systems and methods described herein for remote monitoring and management of dynamic devices. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
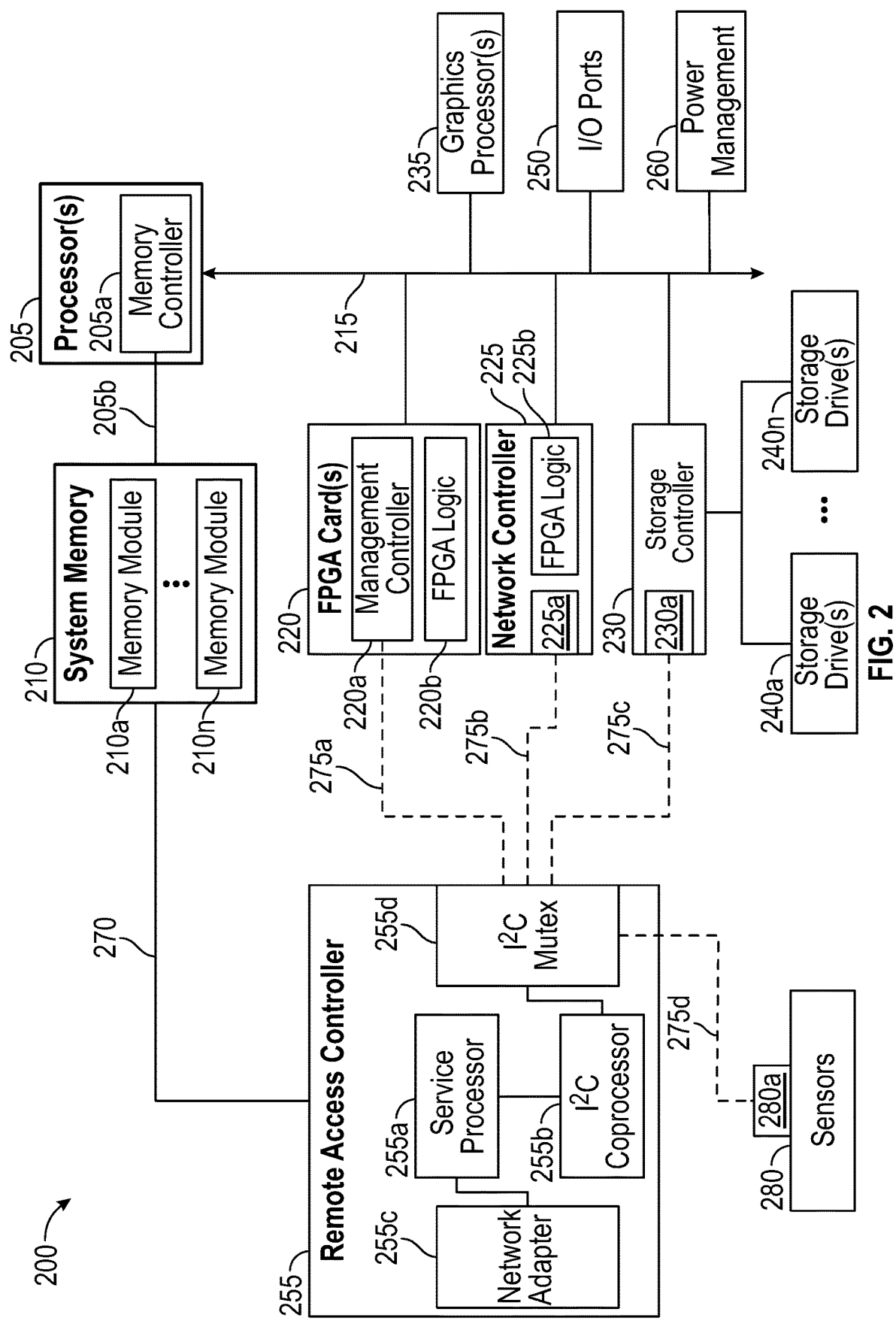
FIG. 2 is a diagram illustrating certain components of an IHS configured as a component of chassis, according to some embodiments, for supporting remote monitoring and management of dynamic devices of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n. As described in additional detail below, remote access controllers 110a-n also support remote monitoring and management of various internal components of the respective compute sleds 105a-n via in-band communications that are supported by the operating systems of the respective compute sleds 105a-n. However, in scenarios where these managed devices are dynamic devices, such as FPGAs that may be reprogrammed to implement different computing functions, in-band management operations are complicated by any differences between the categorization of such dynamic devices by the remote access controllers 110a-n and by the respective operating systems of the compute sleds 105a-n. Embodiments resolve such issues in providing ongoing remote management of such dynamic devices as the computing functions implemented by these dynamic devices are modified.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations.

The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

As illustrated, each of the compute sleds 105a-n also includes an FPGA card 165a-n that may be configured to customize the operations of compute sled 105a-n. As described in additional detail with regard to FIGS. 2 and 3, FPGA cards 165a-n operations may be monitored by remote access controllers 110a-n via both sideband management bus connections and in-band connections supported by the respective operating systems of compute sleds 105a-n. FPGA cards 165a-n may be reprogrammed through instructions that may be provided by the respective FPGA card, where such reprogramming may be initiated by remote access controllers 110a-n and/or initiated by operating system processes of the compute sleds 105a-n.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting remote monitoring and management of dynamic devices of the IHS 200. It should be appreciated that although the embodiments described herein may describe an IHS that is a compute sled or similar computing component that may be deployed within the bays of a chassis, other embodiments may be utilized with other types of IHSs that may also support remote monitoring of dynamic devices. In the illustrative embodiment of FIG. 2, IHS 200 may be a computing component, such as compute sled 105a-n or other type of server, such as an 1 RU server installed within a 2 RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, IHS 200 may include one or more FPGA (Field-Programmable Gate Array) card(s) 220. Each of the FPGA card 220 supported by IHS 200 may include various processing and memory resources, in addition to an FPGA logic unit 220b that may include circuits that can be reconfigured after deployment of IHS 200 through programming functions supported by the FPGA card 220. Through such reprogramming of the logic units 220b, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units 220b, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. As described in additional detail with regard to the below embodiments, the management controller 220a may be configured to collect information for use in determining the type of operations that are currently being implemented using the programmed FPGA logic unit 220b, or from each of the FPGA logic units in scenarios where FPGA card 220 includes multiple logic units that are separately programmed.

An FPGA card 220 may include an external interface that supports reprogramming of the logic unit 220b of the FPGA and also supports certain other operations of the FPGA card, such as monitoring and management of the FPGA card. In some instances, the programmed functions of the FPGA logic unit 220b may be accessed via an operations interface that is accessed via this external interface of the FPGA. For instance, an external FPGA interface may include an operations interface that provides access to the customized functionality of the programmed logic unit 220b. Such an operations interface may support the ability to invoke functions that are being offloaded from the processor 205 of the IHS 200 for execution using the FPGA logic unit 220b that has been programmed to implement these particular functions.

As the FGPA logic unit 220b is re-programmed, the functions implemented by this dynamic device may alter the classification by which the FPGA card 220 is managed. For instance, FPGA logic unit 220b may be initially programmed to support audio processing functions, but after re-programming, may instead support data compression functions. Due to such modifications, the management of the FPGA card 220 should be modified to reflect the change in the type of functions that are implemented by the FPGA card. As described in additional detail below, embodiments provide capabilities for adapting the management of such dynamic devices as they are re-programmed to implemented different types of functions.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. As illustrated, in some embodiments, network controller 225 may include an FPGA logic unit 225b that provides the network controller with FPGA capabilities. For instance, in some embodiments, FPGA logic 225b may be programmed to implement cryptographic operations that are utilized by network controller 225. In such embodiments, FPGA logic 225b should be managed by remote access controller 255 as a cryptographic component, while network controller 225 should be separately managed by remote access controller 225 as a networking component. In order to support effective management in such a scenario, in-band management of these components by the operating system of IHS 200 should likewise recognize network controller 225 as a networking component and FPGA logic 225b as a separate cryptographic component. In various embodiments, additional or different components of IHS 200 may include an embedded FPGA logic unit such as the described embedded logic unit 225b of network controller 225.

Since FPGA logic 225b of network controller 225 may be reprogrammed, in some instances, the FPGA logic 225 may be altered, such as from providing cryptographic operations to providing networking operations such as a packet inspection function. When reprogrammed in such a manner, embodiments support adapting the remote management of network controller 225 to reflect this modification. In this scenario, embodiments support adapting the remote management of network controller 225 to management of network controller 225 as two separate network components, since the FPGA logic 225 not implements a specific networking operation that is distinct from the networking operations being supported by network controller 225. Embodiments support a coordinated adaptation of the management of network controller 225 by the remote access controller 255 and by the operating system of IHS 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255.

In some embodiments, graphics processor 235 may itself be configured in a manner similar to the reprogramming of the described FPGA logic units. For instance, in graphics processor 235 may be configured for supporting non-graphics computing functions, such as cryptographic, artificial intelligence and/or scientific computations. In such instances, graphics processor 235 should be managed by remote access controller 255 based on the types of computing operations that are currently being supported by graphics processor 235. In order to support effective management in such a scenario, in-band management of graphics processor 235 by the operating system of IHS 200 should recognize graphics processor 235 in this same manner. In various embodiments, other types of processors of IHS 200 may be similarly repurposed and thus remote managed based on the types of operations that are currently being supported.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275a-d used for device management. In various embodiments, additional or different components of IHS 200 may be managed by remote access controller 225 through the use of sideband bus connections. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280. In certain embodiments, the endpoint I2C controller 280a of the FPGA card 220 may correspond to the management controller 220a described above.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
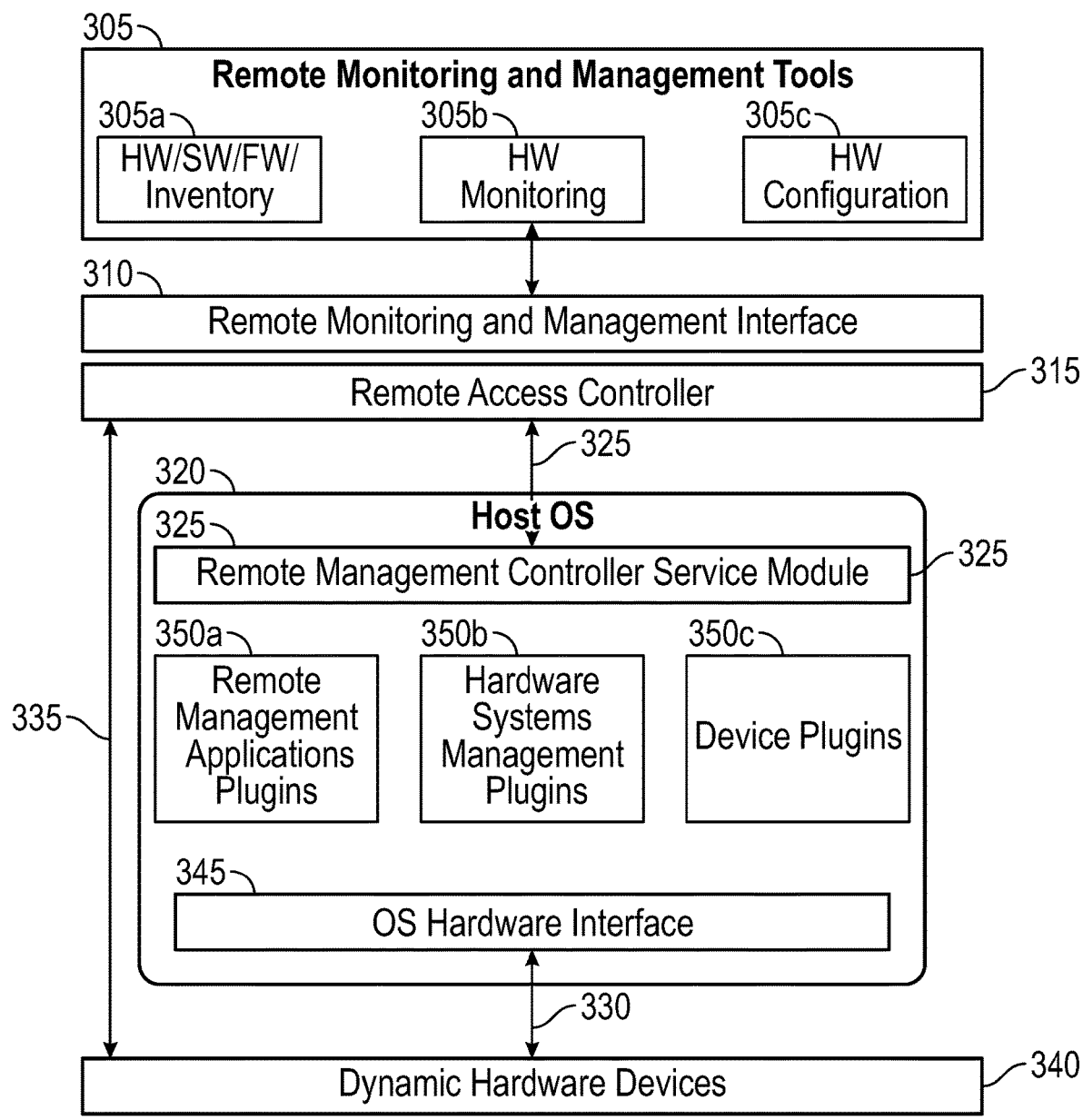
FIG. 3 is a diagram illustrating certain components of a system, according to some embodiments, for supporting remote monitoring and management of dynamic devices of an IHS.

FIG. 3 is a diagram illustrating certain components of a system, according to some embodiments, for supporting remote monitoring and management of dynamic devices of an IHS. As illustrated, a system according to embodiments may include one or more dynamic hardware devices 340, such as the dynamic devices described with regard to FIGS. 1 and 2. For instance, the dynamic hardware devices 340 may include FPGA logic units that may be reprogrammed to perform specialized functions in support of the operation of an IHS. Such dynamic hardware devices 340 may alternatively or additionally include various types of graphics processing units (GPUs) and digital signal processors (DSPs) that may be similarly reconfigured to perform specialized functions.

As illustrated in FIG. 3, embodiments may include applications that run in the operating system 320 of an IHS, where these applications interface with the dynamic hardware devices 340 over an in-band management interface 330, such as may be supported by the BIOS and/or UEFI of the IHS. The system also includes a remote access controller 315 that interfaces with the dynamic hardware devices 340 over a sideband management interface 335. As described, effective management of the dynamic hardware devices 340 is precluded by inconsistent classification of the dynamic devices by the operating system 320 and by the remote access controller 315. For example, an FPGA logic unit that is an embedded component of a network controller may be classified as a networking component by the remote access controller 315, while the operating system 320 may classify the embedded FPGA according to a set of specialized cryptographic operations that it has been programmed to implement. Embodiments prevent such inconsistencies and provide techniques for coordinating the ongoing management of such dynamic devices by the operating system 320 and a remote access controller 315 as the dynamic devices 340 are repurposed to support different computing operations.

As described with regard to FIG. 2, a remote access controller 315 may be a component of an IHS that operates externally to the operating system 320 of an IHS and provides remote monitoring and management of various managed devices of an IHS, where the remote access controller 315 interfaces with the managed devices via sideband management connections 335 that are external to the operating system 320. The remote access controller 315 may support remote management of the managed devices of an IHS via a set of remote monitoring and management tools 305. Such remote tools 305 may provide an administrator with various capabilities for remotely investigating, diagnosing and administering the operation of an IHS.

For instance, the remote tools 305 may include an inventory 305a of the hardware, software and firmware of an IHS that are being remotely managed through the operation of the remote access controller 315. The remote tools 305 may also include various monitoring interfaces 305b for evaluating telemetry data collected by the remote access controller 315. The remote tools 305 may also include configuration information 305c for some or all of the hardware components that are being managed. In some embodiments, such remote monitoring and management tools 305 may interface with a remote access controller 315 via a remote monitoring and management interface 310, such as the Redfish remote management interface. These remote monitoring and management capabilities may rely on classifications of the hardware devices that are being managed. For instance, a hardware component classified as a networking component may be managed using tools that characterize the network traffic that is being processed by that component. In this same manner, a hardware component that is classified as a cryptographic component may be managed using different tools that characterize the cryptographic operations that are performed by the component.

In implementing the monitoring and management operations, the remote access controller 315 may collect information from the managed component directly via the sideband management interface 335, and may also collect information indirectly from the operating system 320 via an in-band management connection 325. As illustrated, the operating system 320 may include a remote management controller service module 325 that interfaces with the remote access controller 315. In various embodiments the remote management controller service module 325 may rely on various modules that operate within the operating system 320 in order to interface with dynamic hardware devices 340 via the hardware interfaces 345 that are supported by the operating system 320. Such modules may include remote management application plugins 350a that implement specific remote management capabilities, such as data collection in support of specific remote management tools 305. These modules may also include hardware systems management plugins 350b that collect system-level hardware information, such as environmental and physical security sensor data. The modules may also include device plugins 350c that specialize in collecting telemetry data from specific hardware devices and/or specific types of hardware devices. Accordingly, the classification of dynamic devices by such device plugins 350c and by the other tools utilized by the remote management controller service module 325 for in-band management via the operating system hardware interface 345 must be consistent with the classification of the dynamic device that is utilized by the remote access controller 315 in its management of the dynamic devices via the sideband management connection 335.

Figure 4:
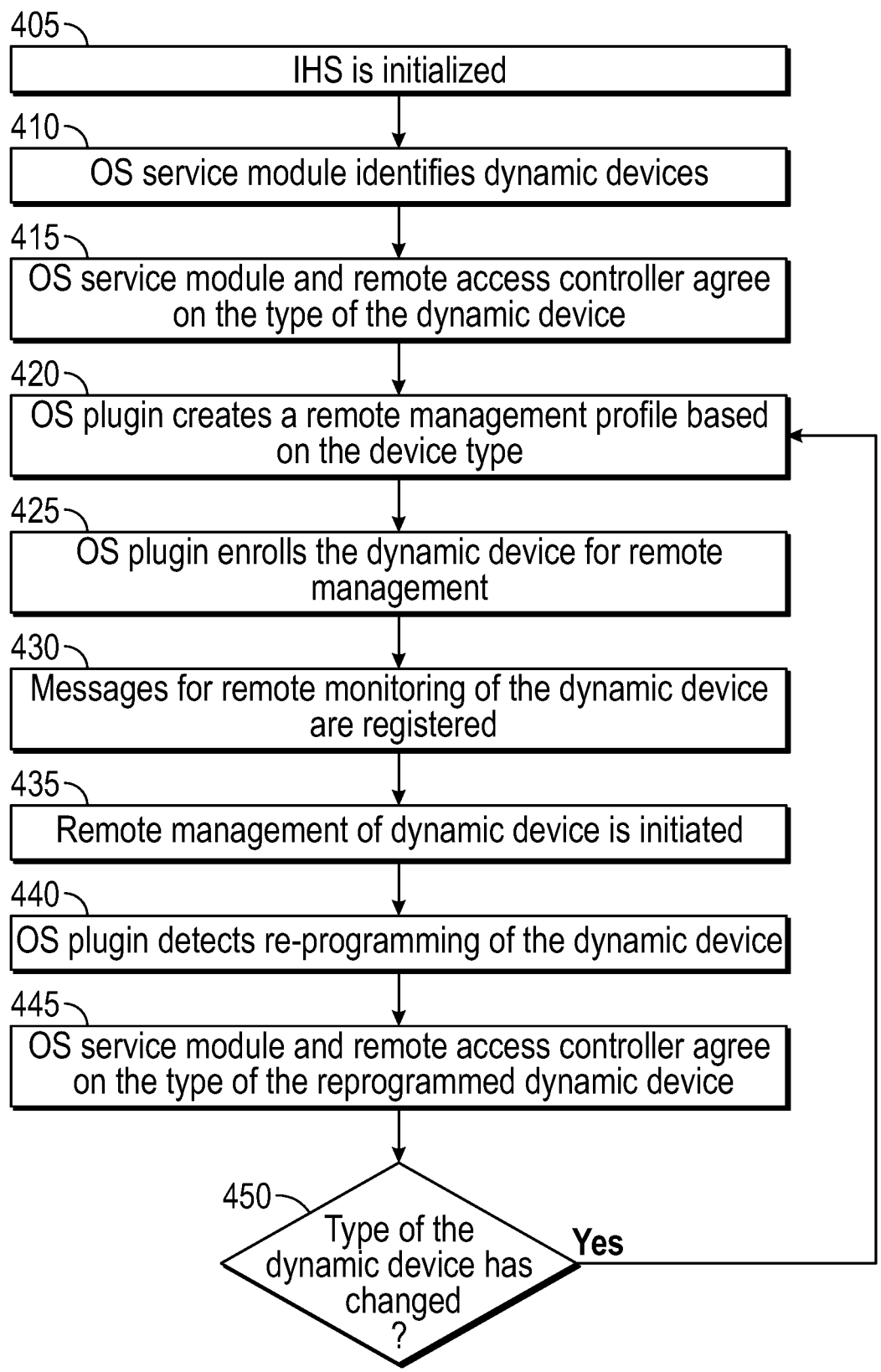
FIG. 4 is a flowchart describing certain steps of a method, according to some embodiments, for supporting remote monitoring and management of dynamic IHS devices.

FIG. 4 is a flowchart describing certain steps of a method, according to some embodiments, for supporting remote monitoring and management of dynamic IHS devices. Some embodiments may begin at block 405 with the initialization of an IHS, where the initialization may include powering or restarting an IHS and booting of its operating system. As described with regard to FIG. 3, embodiments may utilize a remote management controller service module that runs within the operating system of an IHS. At block 410, such a remote management controller service module of the operating system may identify the hardware devices of an IHS that are dynamic devices. In some instances, all devices determined to be FPGA logic units may be classified as dynamic devices. As described with regard to FIG. 2, FPGA cards may support a management interface that is used to reprogram the FPGA logic unit of the card. Accordingly, such FPGA cards may be identified as dynamic devices through queries to such management interfaces. In some instances, such queries may indicate that an FPGA card supports multiple logic units that may be separately programmed. In some instances, any FPGA logic unit that is an embedded component of a host device may be identified as a dynamic device, where the embedded FPGA logic unit may be treated as a separate dynamic device from its host device. As described, components such as a network controller may include an embedded FPGA logic unit that may be reprogrammed to implement various types of specialized operations. Such embedded FPGA logic units may be identified through queries to the host device and/or based on information collected from the operating system, such as information available from the hardware interface of the operating system. In the same manner, the remote management controller service module or other operating system applications may also identify any programmable processors, such as programmable GPUs.

At block 415, the remote management controller service module and the remote access controller reach an agreement on a classification for the identified dynamic devices. In some instances, the hardware interface of the operating system, such as the BIOS and/or UEFI, may have more detailed information regarding hardware components of an IHS than is available to a remote access controller. As described with regard to FIG. 2, a remote access controller may interface with the managed device via a sideband connection supported by a management controller of the managed device. Such management controllers may support a limited set of functions that are directed at the remote management of the device. The hardware interface of the operating system, on the other hand, may have visibility into the full range of operations that are supported by a managed device, such as whether a managed device includes any embedded FPGA logic units.

Accordingly, in some embodiments, the agreement on the classification of a dynamic device may be implemented by deferring to the classification of the dynamic device by the hardware interface of the operating system. In other embodiments, such agreement may be implemented by deferring to the most specific classification of the dynamic device that is available. For instance, the operating system of an IHS may identify an FPGA card as a programmable FPGA logic unit, but the remote access controller may be able to classify the same FPGA card according to its programmed implementation of cryptographic operations. In such instances, the classification of the FPGA card would be agreed as being a cryptographic device. In some embodiments, the classification of the dynamic device may defer to the classification by the remote access controller, even if less specific than the classification by the operating system, in order to provide remote management according to a classification that is supported by a particular remote management interface, such as the Redfish management interface. In some embodiments, the classification of a dynamic device may be determined based on acceleration functions that have been associated with the dynamic device, where these acceleration functions may be determined based on queries by the device plugin and/or by the remote access controller.

Once the classification of the dynamic device has been determined, at block 420, the remote management controller service module creates a remote management profile for the dynamic device. As described with regard to FIG. 3, the remote management controller service module may utilize device-specific software plugins for management of each individual device. In such embodiments, these plugins may be configured to generate a management profile that specifies the telemetry data that will be collected from the dynamic device via the in-band management interface. This management profile may also specify various types of remote management commands that are supported by the dynamic device, such as capabilities to stop and start the dynamic device. In some embodiments, this management profile may conform to a schema that is supported by a remote management interface, such as the Redfish management interface.

Using the generated management profile, at block 425, the plugin that corresponds to the dynamic device enrolls the dynamic device with the remote access controller through enrollment operations that are supported by the remote management controller service module. Upon receiving the enrollment of the dynamic device, at block 430, the remote access controller registers messages that will be generated in the management of the dynamic device according to the provided profile. In some embodiments, these messages may include remote management messages specified by a remote management interface, such as the Redfish management interface. These messages may also include various messages that will be generated by the remote access controller upon detecting specific events within the telemetry data that is collected from the dynamic device via the in-band monitoring by the device plugin and/or by the sideband monitoring by the remote access controller.

At block 435, remote management of the dynamic device is initiated using the messages that have been registered by the remote access controller. Once remote management has been initiated, the remote access controller dispatches messages to the remote management tools based on the data collected from the in-band device plugin and from the sideband monitoring by the remote access controller. During this interval, the dynamic device is classified according to the agreed determination, where this determination reflects the programmed operations of the dynamic device. At block 440, the device plugin that corresponds to the dynamic device detects reprogramming of the dynamic device. In some instances, the device plugin may detect a change to an acceleration function that is implemented by the dynamic device.

In scenarios where the dynamic device is an FPGA logic unit, the device plugin may detect a change in the operations interface implemented by the FPGA. For instance, the device plugin may detect changes in the operations interface of an FPGA from supporting cryptographic operations to compression operations, thus indicating a reprogramming of the FPGA logic unit. In instances where a single FPGA card includes multiple separate logic units, the device plugin may detect reprogramming of individual logic units, such as by detecting changes in the operations interface supported by an individual FPGA logic units and/or be detecting changes to the acceleration function associated with an individual FPGA logic unit. As described, some dynamic devices may support reprogramming by a remote access controller. In such scenarios, the device plugin may be informed of a change to the programming of a dynamic device by the remote access controller.

When a device plugin detects reprogramming of a dynamic device, at block 445, the remote management controller service module and the remote access controller agree on the type of the reprogrammed device. In the same manner as described above, various techniques may be utilized in determining an agreed classification for a dynamic device. Upon reaching agreement on the type of the reprogrammed dynamic device, at block 450, the device plugin determines whether the reprogramming of the device corresponds to a change to the classification of the dynamic device. If the reprogramming does not correspond to a change in the classification of the dynamic device, such as may result from editing the operations implemented by the dynamic device in order to correct an error, the remote management of the dynamic device may continue according to the existing configuration. However, if a change in the classification of the dynamic device is detected, embodiments may return to block 420 and the device plug-in may generate an updated management profile for the dynamic device based on the updated classification for the dynamic device. The remaining steps of the method of FIG. 4 may continue as described such that the updated dynamic device is enrolled for remote management using new messages that correspond to the updated classification of the dynamic device. In this manner, embodiments support ongoing remote management of dynamic devices as they are reprogrammed to implement different types of operations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
a plurality of dynamic devices, wherein each dynamic device comprises re-programmable logic circuitry;
one or more processors;
one or more memory devices coupled to the processors, the memory devices storing computer-readable instructions that, upon execution by the processors, cause operating system applications of the IHS to:
identify the plurality of dynamic devices;
determine a type of a first of the dynamic devices based on an operation implemented by the re-programmable logic circuitry of the first dynamic device; and
enroll the first dynamic device for management by a remote access controller based on the determined type of the first dynamic device; and
the remote access controller comprising one or more logic units and further comprising one or more memory devices storing computer-readable instructions that, upon execution by the logic units, cause the remote access controller to:
register, in response to the enrollment, a first plurality of messages for the first dynamic device, wherein the messages are selected based on the determined type of the first dynamic device; and
initiate remote management of the first dynamic device by generating the registered messages; and
wherein the execution of instructions by the processors further cause the operating system applications to detect programming of the re-programmable logic circuitry of the first dynamic device and to determine when the detected programming changes the type of the first dynamic device from the identified type.

2. The IHS of claim 1, wherein the first dynamic device comprises an FPGA (Field Programmable Gate Array) card.

3. The IHS of claim 1, wherein the first dynamic device comprises an embedded FPGA logic unit.

4. The IHS of claim 3, wherein the embedded FPGA logic unit is programmed to implement cryptographic protocols utilized by a network controller card and wherein the type of the FPGA logic unit is determined based on the FPGA logic unit implementing cryptographic operations.

5. The IHS of claim 4, wherein the remote access controller manages the network controller card as a networking component and manages the embedded FPGA logic unit of the network controller card as a cryptographic component.

6. The IHS of claim 1, wherein the execution of instructions by the processors further causes the operating system applications to enroll the first dynamic device for management by a remote access controller based on an updated type of the first dynamic device when the detected reprogramming of the changes the type of first dynamic device.

7. The IHS of claim 1, wherein the operation used to determine the type of the first dynamic device comprises an acceleration function implemented using the re-programmable logic circuitry of the first dynamic device.

8. The IHS of claim 1, wherein the first dynamic device comprises a programmable digital signal processor.

9. The IHS of claim 1, wherein the first dynamic device comprises a programmable graphics processing unit.

10. A method comprising:
identifying a plurality of dynamic devices of an IHS (Information Handling System), wherein each of the dynamic devices comprises re-programmable logic circuitry, wherein the dynamic devices are identified by an operating system application supporting remote management of the IHS;
determining, by the operating system application, a type of a first of the dynamic devices based on an operation implemented by the re-programmable logic circuitry of the first dynamic device;
enrolling, by the operating system application, the first dynamic device for management by a remote access controller of the IHS based on the determined type of the first dynamic device;
registering, by the remote access controller, a first plurality of messages for the first dynamic device, wherein the messages are selected based on the determined type of the first dynamic device;
initiating, by the remote access controller, remote management of the first dynamic device by generating the registered messages;
detecting, by the operating system application, programming of the re-programmable logic circuitry of the first dynamic device; and
determining, by the operating system application, when the detected programming changes the type of the first dynamic device from the identified type.

11. The method of claim 10, wherein the first dynamic device comprises an FPGA (Field Programmable Gate Array) card.

12. The method of claim 10, wherein the first dynamic device comprises an embedded FPGA logic unit.

13. The method of claim 12, wherein the embedded FPGA logic unit is programmed to implement cryptographic protocols utilized by a network controller card and wherein the type of the FPGA logic unit is determined based on the FPGA logic unit implementing cryptographic operations.

14. The method of claim 13, wherein the remote access controller manages the network controller card as a networking component and manages the embedded FPGA logic unit of the network controller card as a cryptographic component.

15. The method of claim 10, further comprising enrolling the first dynamic device for management by a remote access controller based on an updated type of the first dynamic device when the detected reprogramming of the changes the type of first dynamic device.

16. The method of claim 10, wherein the operation used to determine the type of the first dynamic device comprises an acceleration function implemented using the re-programmable logic circuitry of the first dynamic device.

17. One or more computer-readable storage devices having instructions stored thereon for providing remote management of an IHS (Information Handling System), wherein execution of the instructions by one or more processors of the IHS causes the one or more processors to:
identify a plurality of dynamic devices of an IHS (Information Handling System), wherein each of the dynamic devices comprises re-programmable logic circuitry, wherein the dynamic devices are identified by an operating system application supporting remote management of the IHS;

determine a type of a first of the dynamic devices based on an operation implemented by the re-programmable logic circuitry of the first dynamic device;

enroll the first dynamic device for management by a remote access controller of the IHS based on the determined type of the first dynamic device;

register a first plurality of messages for the first dynamic device, wherein the messages are selected based on the determined type of the first dynamic device;

initiate remote management of the first dynamic device by generating the registered messages;

detect programming of the re-programmable logic circuitry of the first dynamic device; and determine when the detected programming changes the type of the first dynamic device from the identified type.

18. The storage devices of claim 17, wherein the first dynamic device comprises an FPGA (Field Programmable Gate Array) card.

19. The storage devices of claim 17, wherein the first dynamic device comprises an embedded FPGA logic unit.

20. The storage devices of claim 17, wherein the operation used to determine the type of the first dynamic device comprises an acceleration function implemented using the re-programmable logic circuitry of the first dynamic device.

* * * * *